United States Patent

Gripe et al.

[11] 3,985,337
[45] Oct. 12, 1976

[54] SPOOL VALVE

[75] Inventors: William B. Gripe, Concord; Melvin H. Norman, Oakland, both of Calif.

[73] Assignee: Amot Controls Corporation, Richmond, Calif.

[22] Filed: Sept. 25, 1975

[21] Appl. No.: 616,595

Related U.S. Application Data

[62] Division of Ser. No. 391,679, Aug. 27, 1973, Pat. No. 3,926,444.

[52] U.S. Cl. .......................... 251/324; 251/DIG. 1; 137/625.69
[51] Int. Cl.² .......................... F16K 3/28; F16J 9/00
[58] Field of Search ................. 137/625.69, 625.48; 251/DIG. 1, 357; 277/177, 171

[56] References Cited
UNITED STATES PATENTS

| | | | |
|---|---|---|---|
| 3,031,200 | 4/1962 | Hamer | 277/177 |
| 3,347,555 | 10/1967 | Horton | 277/171 |
| 3,635,249 | 1/1972 | Kirkman | 137/625.69 X |

FOREIGN PATENTS OR APPLICATIONS

| | | | |
|---|---|---|---|
| 419,751 | 3/1967 | Switzerland | 277/177 |

*Primary Examiner*—Arnold Rosenthal
*Attorney, Agent, or Firm*—Warren, Chickering & Grunewald

[57] ABSTRACT

A spool valve having a ported valve chamber and a valve spool mounted for reciprocation therein and carrying an elastomeric seal ring in sliding engagement with the chamber wall for controlling fluid flow through the valve port in the wall, the seal ring having a torus portion and a flexible web co-functioning with the spool seal ring mounting groove to provide desired sealing and valving action.

7 Claims, 5 Drawing Figures

U.S. Patent    Oct 12, 1976    3,985,337

SPOOL VALVE

The present application is a division of our Application Ser. No. 391,679, filed Aug. 27, 1973 for Seal Ring, now U.S. Pat. No. 3,926,444.

BACKGROUND OF THE INVENTION

1. Field of Invention

The invention relates to spool valves having a ported valve chamber and a valve spool mounted for reciprocation therein and carrying an O-ring in sliding engagement with the chamber wall for controlling fluid flow through the valve port therein.

2. Description of Prior Art

Spool valves of the character described have used two basic types of O-rings. The usual commerical style O-ring is compressed radially so as to provide simultaneous sealing of the ring at its outside diameter and its inside diameter (with the root surface of the ring groove). When properly installed, this type of O-ring provides a very satisfactory seal. However, the requirements of commercial tolerances in the parts require designing for a cnsiderable amount of squeeze or compression with attendant high friction forces. Customarily, relatively large size O-rings, that is, having a relatively large torus section, are used to obtain a reduced ratio of squeeze to cross-sectional area and smaller radial compression forces. For example, in spool valves having O-rings up to approximately ½ inch OD, the commercially recommended diameter of the torus section is 0.070 inch; and the recommended torus section, diameter is 0.103 inch for O-rings of ½ inch to 1 inch OD.

The use of a so-called "floating" O-ring has been proposed to overcome the aforementioned high frictional forces. In this type of seal ring, the compression of the O-ring against the adjacent cylindrical surface is maintained, but the internal diameter of the O-ring is not forced into contact with the root wall of the ring groove. Sealing is effected at the side walls of the groove and the adjacent cylindrical surface. Substantially less friction is normally found in this type of seal. However, to obtain a seal it is essential that the O-ring be moved laterally across the interior of the ring groove and into sealing engagement with one of the groove side walls. Such displacement will dependably occur when there is a rapid application of pressure sufficient to move the ring into its sealing position. When the pressure builds up slowly, however, as may occur in many applications, leakage will occur around the ring.

Another disadvantage found in the relative large size O-rings heretofore used is the attendant relatively large movement required of the spool valve in effecting its valving action and to provide adequate fluid flow passage. Accompanying such large required movement is also a lack of precision. Generally, the "cut-off" or sealing point is better defined when a narrow seal band width is used than when a wide band is used resulting from a highly compressed large section O-ring.

SUMMARY OF THE INVENTION

The valve of the present invention uses an O-ring form of seal having integral torus and web sections as more fully hereinafter defined, and which co-function with the other parts of the valve to provide:

1. low friction, enabling instantaneous and dependable responsive displacement of the spool valve;
2. an excellent seal under diverse operating conditions, ranging from a rapid to a slow build-up of fluid pressure;
3. greatly improved durability; and
4. a shorter travel of the valve spool to open and close the valve ports, thereby affording improved speed of operation, reduced wear, greater precision in operation, i.e., more accurate positioning of the valve spool in port opening and port closing positions, and lower cost operators to move the valve spool.

The invention possesses other objects and features of advantage, some of which of the foregoing will be set forth in the following description of the preferred form of the invention which is illustrated in the drawing accompanying and forming part of this specification. It is to be understood, however, that variations in the showing made by the said drawing and description may be adopted within the scope of the invention as set forth in the claims.

DETAILED DESCRIPTION OF INVENTION

Figure 1:
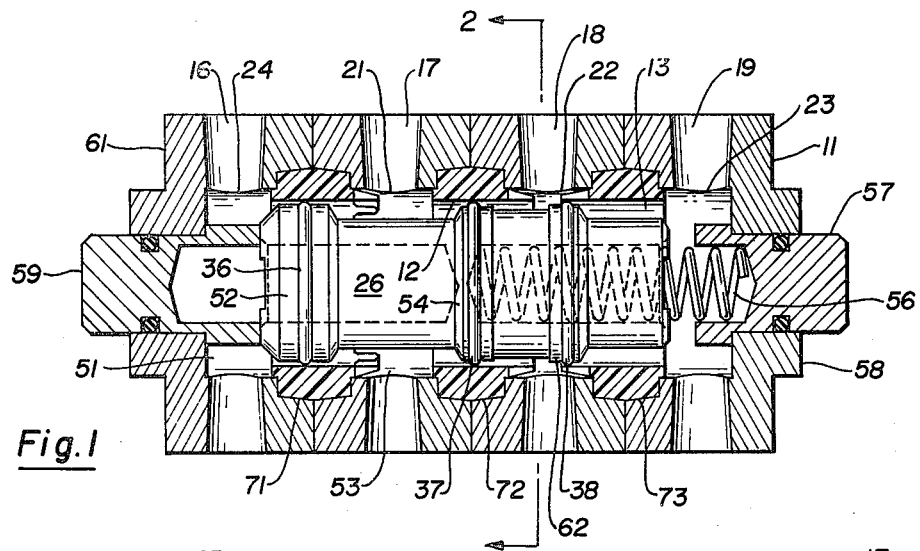
FIG. 1 is a cross-sectional view of a spool valve constructed in accordance with the present invention.
Figure 4:
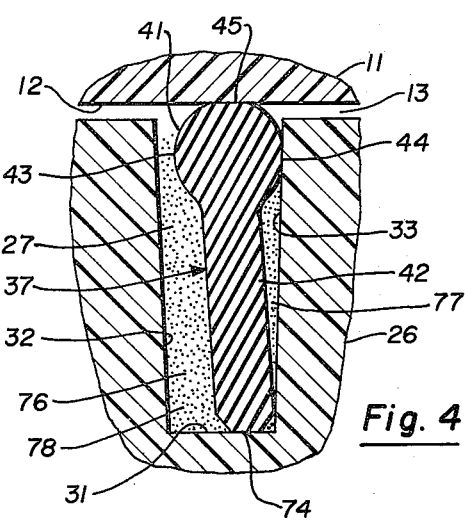
FIG. 4 is a further enlarged fragmentary cross-sectional view of a portion of the valve illustrated in FIG. 3.
Figure 2:
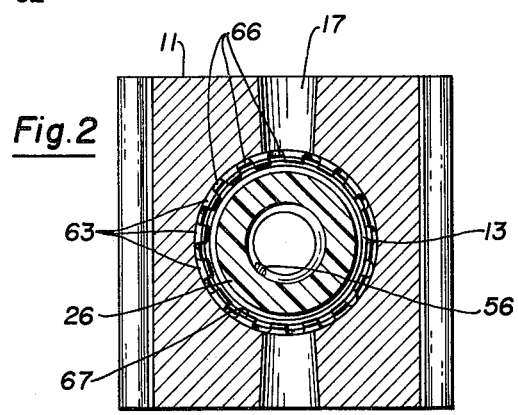
FIG. 2 is a cross-sectional view of the valve taken substantially on the plane of 2—2 of FIG. 1.
Figure 3:
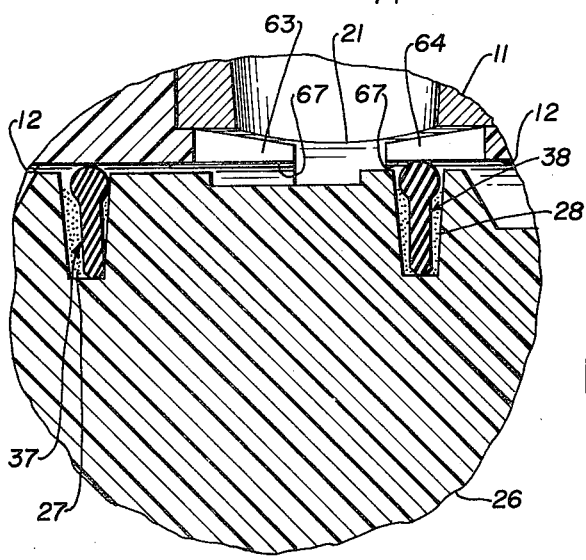
FIG. 3 is an enlarged fragmentary cross-sectional view of a portion of the valve illustrated in FIG. 1.
Figure 5:
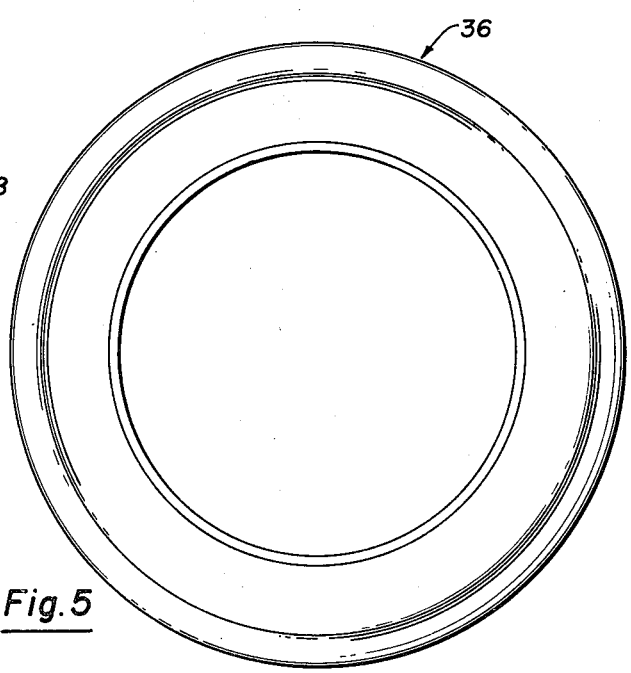
FIG. 5 is a front elevation of a seal ring used in the valve.

The spool valve of the present invention comprises, briefly, a housing 11 having an interior cylindrical wall 12 defining a valve chamber 13 and formed with a plurality of passages 16, 17, 18 and 19, which open into the interior of the housing and provide valve ports 21, 22, and 23 and pilot port 24;

a spool valve member 26 mounted for longitudinal reciprocation in chamber 13 across ports 21–23 and formed with a plurality of circumferentially extending ring grooves, see grooves 27 and 28 in FIGS. 3 and 4, in planes perpendicular to the axis of chamber 13, each groove having root and opposed side walls 31, 32, and 33, respectively;

a plurality of seal rings 36, 37, and 38 mounted one in each of the ring grooves and each having a torus portion 41, see FIG. 4, of circular cross-section and a diameter less than the spacing between groove side walls 32 and 33 and extending from its groove 27 into engagement with the interior cylindrical chamber wall 12 for longitudinal sliding movement thereover into and out of registration with at least one of the ports, see port 21 in FIG. 3, each ring being formed with an integral, concentric annular flexible and compressible web 42, see FIG. 4, secured to torus portion 14 and extending radially therefrom into engagement with the root wall 31 of the groove and being joined to the torus portion at its center plane and leaving a free torus portion periphery comprising a circular segment greater than 180°, providing three perpendicularly related arcuate sealing surfaces 43, 44, and 45 juxtaposed to and engageable in line contacts with groove side walls 32 and 33 and chamber wall 12; and the ring diameters of torus portion 41 and web 42 providing simultaneous pressure fit against the chamber and root walls 12 and 31, respectively.

The structure depicted in FIG. 1 for purposes of illustrating the present invention is a pressure-piloted (actuated) 3-way spring return valve with optional manual operation. Passage 16 is connected to a fluid pressure signal source and connects to the interior of the housing which, at this point, functions as a piston chamber 51, shown at the left end of the valve unit in FIG. 1. The adjacent seal ring 36 here functions as a piston ring and is carried by a built-up piston structure 52 and serves to axially displace the spool valve within the valve chamber. Passage 17, shown second from the left in FIG. 1, normally functions as a fluid pressure supply passage and enters a portion 53 of the valve chamber situated between seal rings 36 and 37. It will be noted that the latter is also carried by a built-up piston structure 54 of the same diameter as piston 51 so that the axial force on the spool member due to fluid pressure in chamber 53 is equalized or balanced to zero. Accordingly, any pressure signal input at passage 16 will cause the spool member to move to the right, as seen in FIG. 1, against the action of Helical spring 56 compressed between the right-hand end of the spool member and a manual actuating member 57 mounted for reciprocation through end wall 58 of the housing 11. Upon discontinuance of the pressure signal in passage 16, the spool valve member will be returned to the left by spring 56. A second manual actuating member 59 is here mounted for axial reciprocation through end wall 61 of housing 11 and engages the left end of the spool member, as seen in FIG. 1. Operation of the actuating members 57 and 59 permit overriding of the pressure signal in passage 16 when desired. Passage 18, next to the right from passage 17 in FIG. 1, is normally connected to a part to be actuated, such as a pneumatic cylinder or the like; and seal ring 37, co-functioning with valve port 22, will connect or not passages 17 and 18, depending upon the axial position of the spool valve. Passage 19, at the right end of FIG. 1, normally functions as a vent passage open to the atmosphere. Between passages 18 and 19 and their ports 22 and 23 is the third seal ring 38, also carried in a built-up piston-like structure 62, preferably of the same diameter as piston structures 52 and 54. Seal ring 38 controls the valving of passages 18 and 19 so that in the normal spring-returned position of the spool valve member, as illustrated in FIG. 1, passage 18 will be connected to vent passage 19; and upon displacement of the spool valve member to the right, as seen in the drawing, either by a pressure signal or by actuator 59, supply passage 17 will be connected to cylinder passage 18 and the latter will be closed off from vent passage 19.

In order to aid seal rings 37 and 38 in their valving functions, as above explained, a plurality of circumferentially spaced port fingers 63 and 64 are positioned for engagement by seal rings 37 and 38. Each of these sets of fingers provides passageways 66 between the individual fingers communicating with port 22 and the fingers have arcuate interior faces 67 concentric to, and forming axial extensions of, chamber wall 12 so that rings 37 and 38 will move smoothly from the solid wall portion 12 onto the fingers and vice versa. Preferably, separate members 71, 72, and 73 are mounted in housing 11 and, more specifically, between modular sections thereof, and provide the cylindrical internal surface 12 for sliding contact engagement by seal rings 36, 37, and 38; and the aforementioned fingers 63 and 64 are formed as integral extensions on members 72 and 73. In the interest of economy of production, members 71, 72, and 73 may be of identical form, as here shown. However, the fingers on member 71 are nonfunctional in the present valve, with member 71 simply functioning as a piston, rather than valving, surface. Preferably, web 42 of the seal ring is relatively thin so as to readily accommodate itself to the desired small sealing pressure of its interior surface 74 with the root wall 31 of groove 27 and to permit easy articulation of the seal ring within the groove to perform its sealing function. Preferably, web 42 has a thickness not greater than about one-half of the torus portion 41 and has a radial extension from the torus portion at least equal to, and preferably greater than, the diameter of the torus portion, see FIG. 4. Also, groove side walls 32 and 33 are preferably formed to diverage at least slightly from root wall 31 and is somewhat wider than the seal ring so as to define a pair of chambers 76 and 77 on opposite sides of web 42; and lubricant 78 is mounted in these chambers, the web co-functioning with the groove side walls to displace lubricant 78 to the arcuate sealing surfaces 43, 44, and 45.

The seal ring may be formed of any suitable, relatively soft elastomeric material used for conventional O-rings and having a durometer of about 60–80 Shore A hardness. Nitrile or Buna N (NBR) is a common basic elastomer for O-rings and is obtainable from various commercial sources, including Goodyear Tire and Rubber Co., Firestone Tire and Rubber Co., Naugatuck Chemical, Goodrich Chemical Co., and others. Fluorocarbon rubber (FPM) may also be used. This material is obtainable from E. I. Dupont de Nemours Co. under the trade name Viton.

Ethylene propylene rubber (EPR), as obtained from Parker Seal Co. of Culver City, Calif. and Stillman Rubber Co. of Carlsbad, Calif., may also be used.

The peripheral edge surface 74 of the web is preferably reduced in width, as seen in the drawing, thereby decreasing the force required for obtaining the seal between this surface and root wall 31. The simultaneous seal of the web and torus portions may be obtained by dimensioning the ring diameters of these portions. This may be attained in either of two ways. Where the torus section surrounds the web, as depicted in FIG. 1, the internal diameter of the web may be made a little smaller than the root diameter of the groove, while the external diameter of the torus is made somewhat larger than the internal diameter of surface 12. Since only a very small pressure is required to obtain the web seal, the engagement of web surface 74 against root wall 31 may be obtained solely by the squeezing action of the ring against surface 12. This condition may be obtained even though the internal diameter of surface 74 is somewhat larger than the external diameter of root wall 31. In either case there is a significant over-all reduction in force as compared to the conventional O-ring squeezed between a cylinder and root wall of the ring groove.

In the present construction, the seal ring is carried by the spool valve member and, accordingly, the web 42 is mounted internally of torus portion 41. It will be understood, however, that the invention is equally applicable to a reverse arrangement, with the sealing rings carried by the housing in which the web will surround the torus portion.

The present valve has the following physical and functioning characteristics:

1. torus portion 41 has a diameter approximately one-half or less than the diameter of the industry standard for a floating type O-ring in dynamic use. This small diameter, functioning is cooperation with the other parts, provides a light sealing pressure of the torus section on the solid bore wall, with attendant minimum required force to move the spool member. At the same time, the three perpendicularly related arcuate sealing faces 43, 44, and 45 provide line contact with the engaged surfaces to be sealed and provide the efficient, high quality seal customary with floating O-rings even at low sealing pressures. The small diameter torus section provides minimum axial movement of the spool member for displacing the seal ring from the solid wall section of the bore onto the port fingers and vice versa, resulting in improved speed of operation, reduced wear, greater precision in operation, and lower cost operators to move the spool valve.

2. The thinness of the web and softness and flexibility of the elastomer material from which it is molded, enables the web to readily compress and buckle when placed under sealing pressure. The resultant expansion force of the torus section against the bore wall is not significantly greater with the present seal ring than the customary floating type O-ring.

3. The circular configuration of the torus section and the flexible quality of the web allow for a slight rolling action of the torus section at the beginning of motion of the spool, thus minimizing the breakaway frictional force required to initially displace the spool, and enable the spool to respond rapidly and easily to applied displacement force.

4. The form of the seal ring providing the low sealing pressures as described, the shape of the groove, and the inclusion of the lubricant all co-function to provide a valve structure of outstanding life. The articulation of the web within the groove provides a controlled release of lubricant to the working surfaces. Valves of the type here illustrated have continued to function effectively with ease and precision under tests out to 50 million cycles, with relubrication at about 25 million cycles.

What is claimed is:

1. A valve comprising:
   a housing having an interior cylindrical wall defining a valve chamber and formed with a passage opening to said wall in a valve port;
   a spool valve mounted for longitudinal reciprocation in said chamber across said port and formed with a circumferentially extending ring groove in a plane perpendicular to the axis of said chamber, said groove having root and opposed side walls;
   a seal ring of elastomeric material mounted in said groove and having a torus portion of circular cross-section and a diameter less than the spacing between said side walls and extending from said groove into engagement with said chamber wall for longitudinal sliding movement thereover into and out of registration with said port, said ring being formed with an integral concentric annular flexible and compressible web secured to said torus portion and extending radially therefrom into engagement with said root wall and being joined to said torus portion at its center plane and leaving a free torus portion periphery comprising a circular segment greater than 180° providing three perpendicularly related arcuate sealing surfaces juxtaposed to and engageable in line contacts with said groove side walls and said chamber wall; and
   the ring diameters of said torus portion and said web providing simultaneous pressure fit against said chamber and root walls respectively.

2. A valve as defined in claim 1, and
   a plurality of circumferentially spaced port fingers providing passageways therebetween communicating with said port and having arcuate interior faces concentric to and forming axial extensions of said chamber wall.

3. A valve as defined in claim 2, and
   a member mounted in said housing and providing a cylindrical interior surface defining said chamber wall; and said fingers being formed as integral extensions on said member.

4. A valve as defined in claim 1, said web having a thickness not greater than about one-half of the diameter of said torus portion and having a radial extension from said torus portion at least equal to the diameter of said torus portion.

5. A valve as defined in claim 3, said web having a thickness not greater than about one-half of the diameter of said torus portion and having a radial extension from said torus portion at least equal to the diameter of said torus portion.

6. A valve as defined in claim 4, said groove side walls diverging from said root wall;
   said ring defining with said groove side walls chambers on opposite sides of said web;
   lubricant mounted in said last-named chambers; and
   said web co-functioning with said groove side walls to displace said lubricant to said arcuate sealing surfaces.

7. A valve as defined in claim 6, the elastomeric material forming said seal ring having a durometer of about 60–80 Shore A hardness.

* * * * *